United States Patent Office 3,001,960
Patented Sept. 26, 1961

3,001,960
LIQUID POLYAMIDE COMPOSITION AND
PROCESS FOR PREPARING SAME
Almon G. Hovey, Northford, Conn., assignor to Olin
Mathieson Chemical Corporation, a corporation of
Virginia
No Drawing. Filed Aug. 31, 1959, Ser. No. 836,901
15 Claims. (Cl. 260—18)

The present invention relates to a novel liquid polyamide composition, to a method of preparing the resin, and to compositions which contain it. More particularly, it relates to a liquid polyamide composition which is capable of curing epoxy resins, to a method of preparing the composition, and to mixtures of the composition with complex epoxides.

The epoxide resins have been treated with various curing agents to form resinous products of various physical properties. Some epoxides are available as solid hard resins. Others are available as adhesives of a semi-fluid state, and still others are supplied as liquid adhesive materials which are difficult to dissovle.

Some compositions can be formed which contain both epoxide and amide resin and may be preserved in the liquid state until applied to other substances as a surface coating or adhesive material. When applied as such a coating, they are then subject to being converted to hard compositions by further curing by the application of heat.

It has been found that some of the properties of the epoxy compositions formed in this way are dependent on the properties of the agent used in curing it. For example, where diethylene triamine is used for this purpose, an extremely brittle epoxy resin is produced. Further, the use of volatile low molecular weight agents such as diethylene triamine is hazardous in that it is toxic to persons sensitive to it. Further, these agents may cause dermatitis and for this reason require the use of protective clothing, special ventilation, clean up and other measures which add to the cost of the products formed.

It is accordingly one object of the present invention to provide a novel agent for the curing of epoxy resins.

Another method is to provide a method of forming the novel curing agent.

A further object is to provide a cured epoxy resin having a highly desirable combination of properties at low cost.

Still another object is to provide a composition of complex epoxy resins and polyamides capable of forming resinous materials having a unique combination of properties.

Other objects will be in part apparent and in part pointed out in the description which follows.

In one of its broader aspects, these and other objects of the invention may be achieved by forming a composition for the curing of epoxy resins, which comprises the liquid product formed by the reaction of an alkylene polyamine the principal ingredient of which has at least three amino nitrogens and at least four carbon atoms, with a copolymer formed as the reaction product of a conjugated alicyclic diene monomer with a natural glyceride oil of polyunsaturated fatty acids selected from the group consisting of vegetable drying oils, vegetable semi-drying oils and marine oils.

In one of its narrower aspects a number of objects of the invention can be achieved by forming a complex polyamide by reacting an alkylene polyamine, the principal ingredient of which has at least three amino nitrogens and at least four carbon atoms, with a copolymer of a natural glyceride oil of polyunsaturated fatty acids selected from the group consisting of vegetable drying oils, vegetable semi-drying oils and marine oils with dicyclopentadiene, mixing this complex polyamide with a resinous epoxy composition and allowing said polyamide resin to react with the epoxy resin to form a solid product.

The method of practicing this invention may be explained with greater clarity by reference to the accompanying examples which illustrate a number of methods of carrying out the invention. It will be understood that the scope of the invention is not intended to be restricted to the scope of these examples.

*Example I*

About 2330 grams of alkali refined linseed oil, having an acid number of 2.5, a Gardner color of 5, and a Gardner viscosity of A, are charged into a stainless steel autoclave with 512 grams of dicyclopentadiene (90 to 92% reactive). The contents of the autoclave are heated and agitated for approximately five hours at 270 to 280° C. until the bodied oil copolymer formed has a Gardner viscosity of Z3 and a color of 8. The unreacted volatiles are stripped off by vacuum distillation from the oil copolymer. When copolymerization is essentially complete, the batch is then cooled in the absence of air to prevent discoloration.

Other oil copolymers may be prepared at various temperatures by reacting the alkali refined natural oils with alicyclic conjugated diene monomers such as 1,3-cyclohexadiene, 2,6-dimethyl-2,4,6-octatriene, and mixtures containing alicyclic conjugated diene monomers as the principal ingredient. For example, a mixture containing up to about 20% of divinyl benzene with dicyclopentadiene may be used to prepare a suitable copolymer oil. Generally for reasons of economy monomer compositions having dicyclopentadiene as the principal ingredient are preferred.

The oil reactant need not be linseed oil but may be any natural vegetable drying oil, vegetable semi-drying oil or fish oil having an iodine number in excess of 130. For example, alkali refined menhaden fish oil may be combined advantageously with dicyclopentadiene.

*Example II*

Approximately 265 grams of the oil prepared as described in Example I were contained in a 3-necked flask of 500 milliliter capacity. This flask was equipped with a stirrer, a thermometer, a reflux condenser and a nitrogen inlet tube adapted to pass nitrogen into the liquid contained in said flask.

The oil was heated to a temperature of about 125° C. and approximately 26 grams of a polyamine mixture were added slowly to the copolymer oil over a period of about one hour. The approximate composition of the polyamine mixture was as follows:

| Ingredient: | Percent |
|---|---|
| Diethylene triamine | 33 |
| Triethylene tetramine | 33 |
| Tetraethylene pentamine | 22 |
| Pentaethylene hexamine | 8 |
| Higher polyamines of the series | 4 |

The reaction mixture was heated for an additional five hours at a temperature ranging between 125 and 155° C. Following this it was raised to a temperature of about 220 to 235° C. and the glycerine and other volatile materials were removed by vacuum distillation to a final absolute pressure of about 5 millimeters.

The resulting product was a reddish liquid resinous product having an amine value of about 50.

*Example III*

Approximately 5 grams of the liquid resin prepared as described in Example II were added to a 50 milliliter beaker. Approximately 5 grams of a liquid epoxy resin were added to the polyamide in the beaker. The contents of the beaker were mixed and were then heated at 100° C. for about 5.5 hours. At the end of the period the contents of the beaker were still soft. The resin was then heated at 150° C. for about 6 hours and the contents of the beaker were found to be converted to a semi-plastic state.

Example IV

Approximately 265 grams of an oil prepared as described in Example I were placed in a flask as described in Example II and heated to about 75° C. Approximately 26 grams of an alkylene polyamine mixture was slowly added to this oil with continuous heating and stirring under reflux conditions. The temperature was raised to about 160° C. The addition of the polyamine took about one hour. The approximate composition of the mixture of polyamine which was used in this case was as follows:

| Ingredient: | Percent |
| --- | --- |
| Diethylene triamine | 85 |
| Triethylene tetramine | 9 |
| Tetraethylene pentamine | 3 |
| Pentaethylene hexamine | 2 |
| Higher polyamines of the series | 1 |

The composition was heated at a temperature between 140 to 185° C. for approximately four hours. After this the temperature was raised to about 220° C. and the composition was then vacuum stripped to a terminal absolute pressure of 6 millimeters to remove glycerol and other volatile constituents. The product formed was a thick viscous amber liquid with an amine value of 45.

Example V

Approximately equal parts of the resin prepared as in Example IV were mixed with a bis-phenol A-epichlorhydrin resin (Epon 1001).

This resin had a melting point of 64–76° C.; a viscosity in poises of 0.9 to 1.6 at 25° C. when combined as a 40% solution of resin in the monobutyl ether of diethylene glycol; an epoxide equivalent of 450 to 525 based on the grams of resin for one gram equivalent of epoxide; and a weight of resin per gallon of 9.9 at 20° C.

The composition was contained in an aluminum weighing dish which was heated at 105° C. for about 20 hours and then at 150° C. for three hours. A hard clear product was formed which had good adhesion to the aluminum dish.

Example VI

Approximately 439 grams of the copolymer oil prepared as described in Example I was placed in a 3-necked flask of one liter capacity, equipped as described in Example II above. The oil was heated to about 135° C. in an inert atmosphere of nitrogen. Diethylene triamine was added at a rate of about two milliliters per minute until a total of 123 milliliters, or 116 grams, of the amine had been added. The composition was then refluxed at 155° C. for approximately one hour.

After the hour of reflux, vacuum was applied and the composition was heated at a temperature of approximately 210° C. until a final pressure of two millimeters absolute was attained. Vacuum distillation was complete in about one and a half hours.

The product was cooled and analyzed and was found to have an amine value of 100.6. This amine value is based on the number of milligrams of KOH per gram of resin. The acid number of the product was less than one. This was a very viscous semi-solid light brown substance. The yield of product formed was approximately 462 grams.

Example VII

Approximately 366 grams of the oil prepared as described in Example I were placed in a 3-necked flask having a capacity of one liter and equipped as described in Example II.

The oil was heated under a nitrogen atmosphere to a temperature of approximately 135° C. The oil was maintained at this temperature and triethylene tetramine was added at the rate of about 1½ milliliters a minute until a total addition of about 140 milliliters, or 137 grams, of the amine had been made. The composition was protected by a nitrogen atmosphere and was refluxed at a temperature of about 155° C. for about one hour.

Glycerol and volatile components were then removed by vacuum distillation to a terminal absolute pressure of about 3 millimeters and a temperature of 210° C. This distillation also lasted about one hour.

The yield of product formed was about 421 grams having an amine value of 163 and an acid number of 0.2.

Example VIII

Approximately 1175 grams of the oil prepared as described in Example I were placed in a 2-liter, 3-necked flask equipped as described in Example II. The oil was heated to a temperature of 120° C. under a nitrogen atmosphere. A mild flow of nitrogen (at a rate of the order of 0.0006 c.f.m.) was continued throughout the reaction and the reflux period.

Approximately 300 milliliters of tetraethylene pentamine were added to the heated oil over a period of one hour while the oil was maintained at a temperature of about 120° C. The composition was heated at 170° C. for about one hour and then heated at about 190° C. for a period of about four hours as the temperature was slowly raised to 230° C. The reflux and flow of nitrogen was discontinued at this point. Vacuum stripping was carrried out at 230 to 250° C. until a terminal absolute pressure of 6 mm. of mercury was achieved.

Approximately 73 grams of distillate were removed during the stripping operation. The product was a viscous liquid having a Gardner color of 12 and a Gardner viscosity of 1590 stokes. The amine value of the product formed was found to be 158 and its acid number was 0.47.

Example IX

Approximately 1175 grams of oil prepared as described in Example I were placed in a 2-liter, 3-necked flask equipped as described in Example II. The oil was heated to a temperature of 120° C. under nitrogen atmosphere and a mild flow of nitrogen was continued throughout the reaction and reflux periods. Approximately 210 grams of diethylene triamine were added to the oil over a period of about one hour at this temperature.

The composition was then refluxed at a temperature of 195° C. for ¾ of an hour. It was then further refluxed at 230° C. for about 1.5 hours. The volatile components of the mixture were removed by vacuum distillation starting at a temperature of 200° C. over a period of about 2 hours during which the temperature was gradually increased to about 240° C. About 75 grams of volatile materials were removed in this way and a final absolute pressure of about 3 millimeters was attained.

The product which formed had a Gardner color of between 14 and 15 and a Gardner viscosity of 2170 stokes. On analysis, it was found that the amine value was 79.7 and the percentage of free glycerin contained was 0.3%.

Example X

Approximately 1175 grams of oil prepared as described in Example I were placed in a 2-liter, 3-necked flask equipped as described in Example II. The oil was heated to a temperature of 120° C. under nitrogen atmosphere and the flow of nitrogen was continued throughout the reaction and reflux periods.

Approximately 210 grams of diethylene triamine were added to the oil which was kept at about 120° C. over a period of about one hour.

The composition was then refluxed at a temperature of 150° C. for 11 hours after which it was allowed to cool, and a sample was taken for analysis. It had an amine value of 105 and a free glycerol content of 8.1%.

A second sample of material prepared as described above, was mixed with an approximately equal quantity of liquid epoxy resin in a small aluminum dish, and the composition was heated at a temperature of 107° C. for 18 hours as a test of its curing properties. At the end of this time the resin was partially cured but had a tacky surface presumably due to occluded glycerol.

The epoxy resin used for this curing test (Epi-Rez 510) was a bis-phenol A-epichlorhydrin composition having a viscosity of 9000 to 18,000 centipoises at 25° C.; a Gardner color of 2; a melting point of 8 to 12° C.; and an epoxide equivalent of 185 to 200 grams per epoxide unit (grams of resin for each gram equivalent of epoxide).

The remainder of the composition in the flask was heated to a temperature of about 50° C. and 500 grams of toluene were added. The temperature was then raised to 90° C. and 800 milliliters of distilled water were added with mixing. The heating and mixing were continued for about ½ hour. The product formed at the end of this heating and mixing period was a stable emulsion in this solvent media. The stability of the emulsion is indicated by the fact that no toluene or water separated overnight and the emulsion was not broken by the addition of 2 ozs. sodium chloride with agitation. The composition remained in a stable emulsified form after being allowed to stand following this treatment.

*Example XI*

Approximately 1175 grams of oil prepared as described in Example I were placed in a 2-liter, 3-necked flask equipped as described in Example II. The oil was heated to a temperature of 120° C. under nitrogen atmosphere and the flow of nitrogen was continued throughout the reaction and reflux periods.

Approximatey 358 grams of tetraethylene pentamine were added to the heated oil over a period of one hour. The composition was then given a series of refluxes at increasing temperatures as follows:

1 hour at 125–130° C.
1 hour at 175° C.
2 hours at 200–230° C.
3 hours at 230° C.

The volatile contents of the composition were removed first by atmospheric distillation and then by vacuum distillation at about 230° C. A total of about 117 grams of volatile components were taken off by these distillations. The product formed had a Gardner color of between 12 and 13 and a Gardner viscosity between Z6 and Z7.

*Example XII*

Three samples of the product as prepared in Example XI were placed in aluminum dishes and quantities of epoxy resin (Epi-Rez 510) were added to each of these dishes. The first dish contained 9 parts of epoxy resin and one part of the polyamide. The second dish contained 9 parts of polyamide and 1 part of epoxy resin. The third dish contained equal parts of epoxy resin and polyamide.

All three samples were heated for one hour at 110° C.

The composition in the dish containing 9 parts of epoxy resin and one part of polyamide formed a cured resinous product whereas the compositions in the other two dishes remained tacky and semi-fluid. This is attributed to the presence of an excess of the curing agent. The preferred ratio for use of the agent prepared in Example XI is approximately one part of agent to nine parts of resin. The tacky or semi-fluid properties which result when excess polyamide is used are attributed to the over-plasticization of the fully cured epoxy resin.

*Example XIII*

Approximately 1175 grams of oil prepared as described in Example I were placed in a 2-liter, 3-necked flask equipped as described in Example II. The oil was heated to a temperature of 120° C. under nitrogen atmosphere and the flow of nitrogen was continued throughout the reaction and reflux periods.

Approximately 262 grams of diethylene triamine were aded to the heated oil over a period of about one hour. The composition was then heated to about 195° C. and refluxed for about two hours. At this point the lower boiling point components were removed through atmospheric distillation and the temperature was then raised to 230° C. The mixture was refluxed at this temperature for about four hours and this was followed by vacuum distillation at 230° C. for about one hour. Approximately 70 grams of volatiles were removed by the vacuum distillation and 23 grams had been removed by the atmospheric distillation. The vacuum distillation was carried to a terminal absolute pressure of 2 millimeters. The properties of the resin formed were as follows: a Gardner color of about 14; a viscosity of 328 stokes; and an amine value of 177.

*Example XIV*

The three samples of the resin prepared as described in Example XIII were placed in three aluminum dishes with quantities of liquid epoxy resin (Epi-Res 510) in the ratios given in Example XII.

The three compositions were heated at 110° C. for one hour. It was found that only epoxy resin contained in the polyamide in the ratio of 9 parts epoxy resin to one part of polyamide resulted in the curing of epoxy resin to solid resinous product.

From the foregoing examples and disclosures, it is evident that a novel curing agent capable of curing epoxy resin to form compositions having highly desirable physical properties is provided in accordance with the present invention.

The cured composition which is formed in this way has certain properties which are advantageous for application of the resin in a number of commercial uses. The advantageous properties may be attributed particularly to the fact that the curing agent contains considerably more hydrocarbon component than is present in resin type curing agents which do not contain the dicyclopentadiene component. Surprisingly, it has been found that these properties are carried over into the cured epoxy composition. For example, one of the important properties of such cured compositions is the increased resistance of the material to alkali substances. For example, where the resin is combined in compositions which may have an essential alkaline character, the resin is found to be highly suitable when combined in these forms.

Another advantage of the polyamide resin formed of the dicyclopentadiene copolymer is that it is more soluble in the low cost hydrocarbon solvents such as toluene and xylene than are the liquid resins made from the polyunsaturated fatty acids of the oils. This advantage is important in forming solutions of the curing agent for use with the epoxy resin in forming protective surface coatings.

A distinct advantage of the curing agent prepared in accordance with this information is that it can be prepared at a low cost by comparison to the other resinous products which are available for a similar purpose. Its low cost is attributed principally to the low cost of both the oil and dicyclopentadiene used in preparing the polymeric oil material.

Since many examples of the foregoing procedures and articles may be carried out and made, and since many modifications can be made in the procedures and articles described without departing from the scope of the subject invention, the foregoing is to be interpreted as illustrative only, and not as defining or limiting the scope of the invention.

What is claimed is:

1. The method of forming a polyamide of relatively high amine number which comprises reacting a copolymer formed as the reaction product of a conjugated alicyclic diene monomer and an alkali refined natural glyceride oil of polyunsaturated fatty acids selected from the group having an iodine number in excess of 130 and consisting of vegetable drying oils, vegetable semi-drying oils and marine oils, with an alkylene polyamine having at least three amino nitrogens and at least four carbons.

2. The method of claim 1 wherein the monomer is dicyclopentadiene monomer.

3. The method of claim 1 wherein the monomer is dicyclopentadiene monomer and the oil is linseed oil.

4. As a curing agent for epoxy resins the non-volatile liquid reaction product of an alkylene polyamine, the principal ingredient of which has at least four carbon atoms and at least three amino nitrogens, with a copolymer formed as the reaction product of a conjugated alicyclic diene monomer and an alkali refined natural glyceride oil having an iodine value in excess of 130 and said glyceride being the oil of polyunsaturated fatty acids selected from the group consisting of vegetable drying oils, vegetable semi-drying oils and marine oils.

5. The agent of claim 4 wherein the monomer is dicyclopentadiene.

6. The agent of claim 4 wherein the oil is linseed oil.

7. The agent of claim 4 wherein the monomer is dicyclopentadiene and the oil is linseed oil.

8. The method of curing epoxy resins which comprises mixing an epoxy resin with a non-volatile liquid polyamide product formed by the reaction of an alkylene polyamine, the principal ingredient of which has at least three amino nitrogens and at least four carbon atoms, with a copolymer formed as the reaction product of a conjugated alicyclic diene monomer with an alkali refined natural glyceride oil having an iodine number of at least 130 and said glyceride being the oil of a polyunsaturated fatty acid selected from the group consisting of vegetable drying oils, vegetable semi-drying oils and marine oils, and heating the mixture.

9. The method of claim 8 wherein the monomer is dicyclopentadiene.

10. The method of claim 8 wherein the monomer is dicyclopentadiene and the oil is linseed oil.

11. The method of claim 8 wherein the ratio of epoxy resin to polyamide is about 9 to 1 and wherein the mixture is heated above 150° C.

12. As a composition of matter an epoxy resin mixed with a liquid polyamide product formed by the reaction of an alkylene polyamine having at least four carbon atoms and at least three amino nitrogens with a copolymer formed as the reaction product of an alicyclic diene monomer with an alkali refined natural glyceride oil having an iodine value in excess of 130, said glyceride being an oil of a polyunsaturated fatty acid and being selected from the group consisting of vegetable drying oils, vegetable semi-drying oils and marine oils.

13. The composition of claim 12 wherein the liquid polyamide product contains no ingredients which are volatile below 230° C. and above about 10 millimeters absolute pressure.

14. The composition of claim 12 in which the monomer is dicyclopentadiene.

15. The composition of claim 12 wherein the ratio of epoxy resin to polyamide is about 9 to 1.

References Cited in the file of this patent

UNITED STATES PATENTS

| 2,667,463 | Jakob et al. | Jan. 26, 1954 |
| 2,767,089 | Renfrew et al. | Oct. 16, 1956 |

FOREIGN PATENTS

| 516,107 | Canada | Aug. 30, 1955 |

OTHER REFERENCES

Rousse et al.: "Curing Agents for Epoxy Resins," pp. 72–80, Paint, Oil and Chemical Review, Nov. 5, 1953.